3,361,398
VIBRATION ISOLATING SYSTEM
Thomas J. Brinkman, Dayton, and Thomas H. Fogt, West Carrollton, Ohio, assignors to General Motors Corporation, Detroit, Mich., a corporation of Delaware
Filed Dec. 20, 1965, Ser. No. 514,912
5 Claims. (Cl. 248—18)

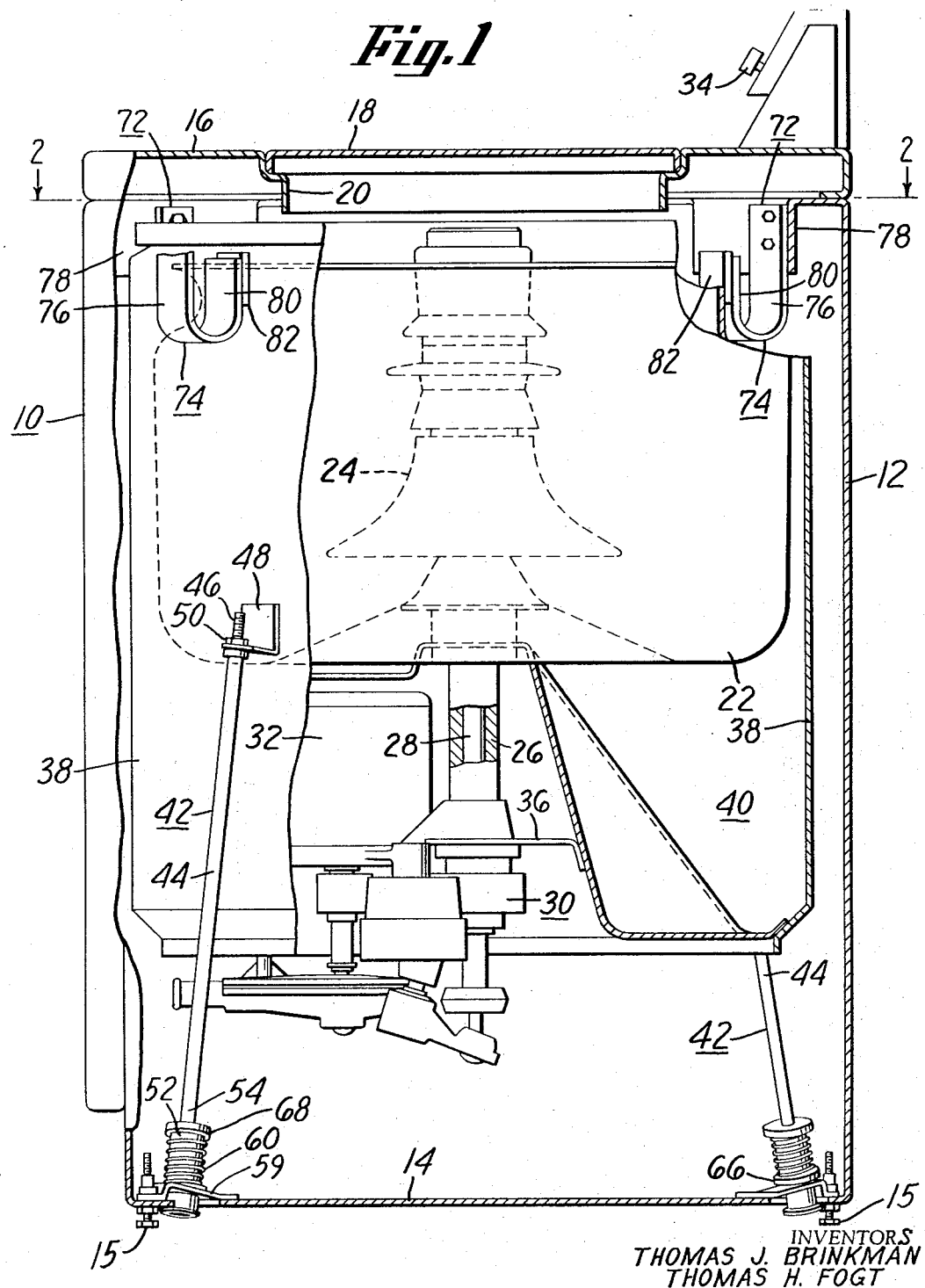

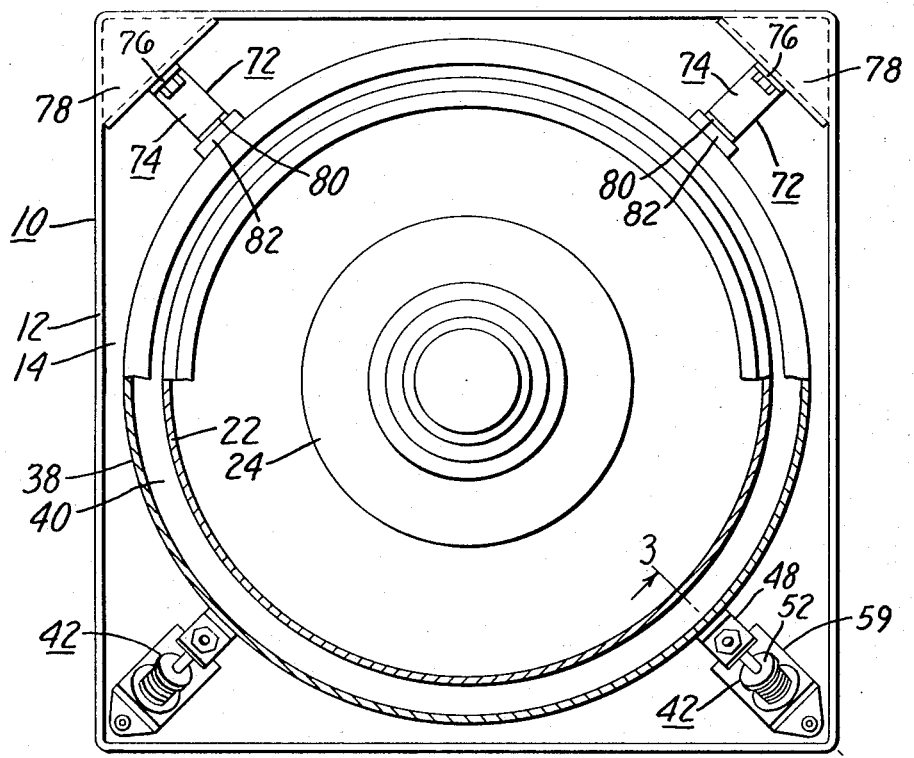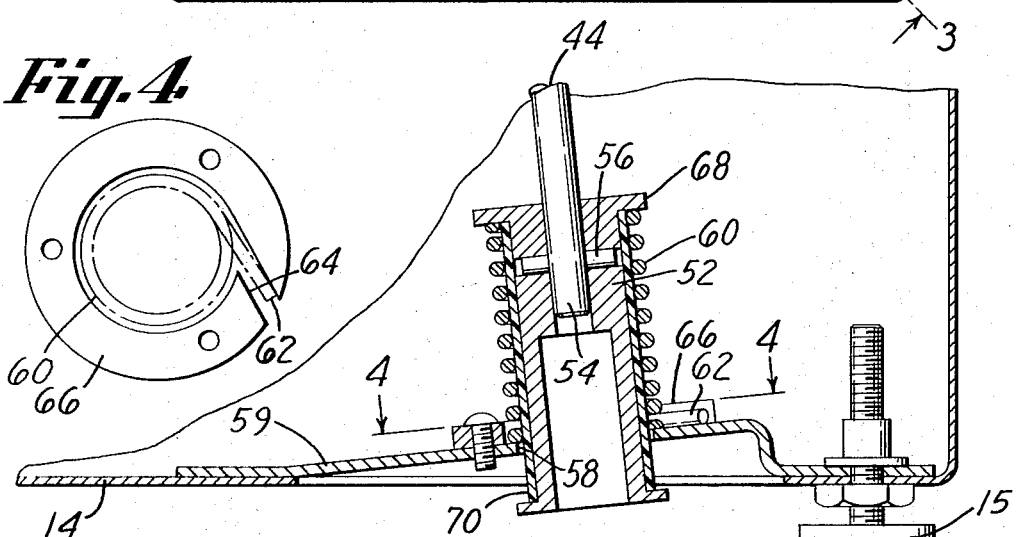

ABSTRACT OF THE DISCLOSURE

In the preferred form a suspension system for a domestic washing appliance having as a suspended mass a water container in combination with a spin tub and a means to rotate the spin tub, all supported from a base frame by a plurality of supporting rods joined at the base frame by a vibration dampening system comprising a spring encircling a cylindrical snubbing element and used to coact with the snubbing element to provide snubbing and also provide a biasing support for the suspended mass.

---

This invention is directed to domestic appliances and more particularly to an improved suspension system for supporting a centrifugal device on a fixed platform such as an operative mechanism of an automatic clothes washer or the like.

In certain centrifugal devices, a rotatable member often is driven at speeds that will produce dynamic loadings in the centrifugal device that might tend to produce undesirable vibrations in a supporting platform. An example of such a system is an automatic domestic clothes washer of the type including a rotatable spin tub that is driven by suitable drive means at high spin speeds to extract fluid from the spin tub during a spin cycle of operation of the machine. In clothes washers in particular, as the spin tub is accelerated toward a predetermined spin speed of operation, it first passes through a critical speed of operation that is dependent upon the physical characteristics of the tub and the amount of clothes loading and washing fluid therein as well as the inherent restraint in the suspension of the rotatable tub on a supporting base and thereafter the tub accelerates to a high spin speed phase of operation which, under certain conditions of operation as, for example, when the clothes load therein is unbalanced, can produce a substantial dynamic loading on the system. The critical speed phase of operation is characterized by a large amplitude movement in the absence of a suitable means for restraining such movement in the suspension system.

An object of the present invention is to improve centrifugal devices by the provision of a suspension system that will relatively flexibly and resiliently support a centrifugal device on a fixed platform to prevent undesirable transfer of forces from the centrifugal device into its support wherein means are included to adequately snub large amplitude movements of the suspended centrifugal device during critical speed operations thereof without undesirably restraining the suspended mass during other phases of operation.

A further object of the present invention is to improve centrifugal devices by the provision therein of a suspension system including a plurality of suspension components each having an elongated load carrying rod maintained in compression by a suspended centrifugal device and wherein the rod carries a cylindrical friction member that is movable with the rod upon operation of the suspended centrifugal device to prevent a direct transfer of forces into the support for the centrifugal device and wherein a spring is located to resiliently carry the weight of the suspended mass during such free movement with the spring being located in frictional engagement with the friction member to produce a predetermined snubbing of relative movement between the centrifugal device and its support platform.

A further object of the present invention is to improve suspension systems for centrifugal devices by the provision of a plurality of upstanding support members each including an elongated support rod maintained in compression by the supported centrifugal device and having a portion thereof vertically reciprocable with respect to a fixed platform and wherein a spring resiliently supports the weight of the supported centrifugal device during such movement and a cylindrical friction member is fixedly secured to the rod and disposed to coact with said spring to produce a predetermined snubbing of such vertical reciprocable movement.

Further objects and advantages of the present invention will be apparent from the following description, reference being had to the accompanying drawings wherein preferred embodiments of the present invention are clearly shown.

In the drawings:

FIGURE 1 is a vertical view of a domestic clothes washer, partially in section and partially broken away, including the present invention;

FIGURE 2 is a view in horizontal section taken along the line 2—2 of FIGURE 1 with a portion thereof being broken away;

FIGURE 3 is an enlarged fragmentary view in vertical section taken along the line 3—3 of FIGURE 2; and FIGURE 4 is a view in horizontal section taken along the line 4—4 of FIGURE 3.

Referring now to FIGURE 1 of the drawings, a domestic clothes washer 10 is illustrated including an outer casing 12 having a base 14 with a plurality of adjustable floor engaging feet 15 thereon. The outer casing 12 also includes a top 16 having a movable door member 18 thereon for closing an access opening 20 in the top 16 that communicates with an open-ended top loading spin tub 22. A vertically reciprocable agitator 24 is representatively shown for working on articles to be cleaned within the spin tub 22 during a washing cycle of operation. A spin tub shaft 26 is secured to the tub 22 and an agitate shaft 28 is secured to the agitator shaft. Both the shafts 26, 28 are connected to a roller drive mechanism 30 including a reversible electric motor 32 operatively conditioned by a cycle controller 34 to effect a predetermined agitate cycle of operation and spin speed cycle of operation in the clothes washer 10. The drive mechanism 30 is merely representative of one suitable drive arrangement, the details of which form no part of the present invention and reference may be made to United States Patent No. 3,087,321, issued April 30, 1963, for an explanation of a representative system of a typical roller drive mechanism.

In the illustrated arrangement, the drive mechanism 30 is secured by a bracket 36 to the underside of a water container 38 that forms a water receiving space 40 into which fluid is extracted from the spin tub 22 during the spin cycle of operation. Suitable plumbing means including water fill conduits and a drain system are omitted in the illustrated arrangement since they form no part of the present invention. However, a typical system of this type is set forth in the above-mentioned patent.

In accordance with certain principles of the present invention, to prevent an undesirable transfer of unbalanced loadings and the like in the washer 10 from the operative components thereof to the outer casing 12, a suspension unit 42 is located at each corner of the outer cabinet 12 for relatively resiliently and flexibly supporting the weight of the operative components of the washer 10 including the spin tub 22, the drive mechanism 30 and the water container 38 on the base 14 of the outer casing 12.

Each of the units 42 includes an elongated upstanding rod 44 that has a threaded upper end 46 thereof directed through an outwardly directed portion of an L-shaped bracket 48 fixedly secured to the water container 38. A suitable fastener, shown as a nut 50, fixes the threaded end 46 of the rod to the bracket 48. On the opposite end of the rod 44 is located a cylindrical plug 52 that is secured to the lower end 54 of the rod by a cross pin 56. The cylindrical plug 52 is directed through an opening 58 in a slightly upwardly inclined shoe or plate 59 that is fixedly secured to the base 14 at one of the corners of the cabinet 12. The cylindrical plug 52 is surrounded by a coil spring 60 that resiliently supports the weight of the operative components of the washer 10 on the base 14.

The coil spring 60, more particularly, has one end 62 thereof located in an opening 64 in an annular spring retainer 66 secured by suitable means to the shoe 59 around the opening 58 therein. The opposite end of the spring 60 engages a radially outwardly directed head portion 68 on the cylindrical plug 52. By virtue of this arrangement, when the spin tub 22 is operated through its critical speed of operation and a substantial unbalanced loading is present therein that is offset from the center of gravity of the suspended components, the support rods 44 will be reciprocated against the force of the spring 60 in a vertical direction so that the plugs 52 will reciprocate freely inwardly and outwardly of the base 14 through the openings 58 in the shoes 59. During this movement, a sleeve 70 of a suitable friction material that is secured to the outer suface of each of the plugs 52 and located in an interference fit with the inner surfaces on the coil spring 60 will coact to produce a snubbing force against large amplitude movements to restrain the suspended components against a large amplitude movement that might cause the water container 38 to undesirably engage the outer casing 12.

Under certain operative loadings, in addition to the vertical reciprocable movement of the cylindrical plug 52, the water container 38 may have a relatively substantial radial movement during the critical speed of operation of the spin tub 22 that likewise will tend to cause the water container 38 to contact the walls of the outer casing 12. Thus, in addition to the snubbing action of the sleeves 70 and springs 60, a plurality of horizontal snubber assemblies 72 are associated with the water container 38 each including a U-shaped spring 74 having one end 76 thereof fixedly secured to a reinforced corner guesset 78 of the casing 12 and a free end 80 thereon that is spring biased radially inwardly toward the top portion of the water container 38. Each of the free ends 80 of the U-shaped spring 74 has a friction pad 82 secured thereto that coacts with the outer surface of the water container 38 to snub large amplitude lateral movements thereof during the critical speed of operation.

In accordance with certain principles of the present invention, in addition to producing desirable snubbing characteristics against large amplitude movements of the water container 38 of the type normally occuring during critical speed of operation of the spin tub 22, the illustrated suspension is characterized by allowing a relative free movement of the water container 38 during high spin speeds of operation of the spin tub 22 as, for example, during a typical spin cycle of operation of the clothes washer 10. During high spin speeds of operation, the movement of the water container 38 is of a low amplitude. The dynamic loadings on the spin tub, however, especially when unbalanced loading occurs in the spin tub 22 during high speeds, are of a very substantial magnitude and the suspension system by virtue of the resilient supporting action of the springs 60 therein will yield against these forces to prevent an undesirable transmission of the forces into the outer casing 12. As a result, during this phase of operation, vibration buildup in the outer casing is minimized.

While the embodiments of the present invention as herein disclosed constitute a preferred form, it is to be understood that other forms might be adopted.

What is claimed is as follows:

1. In a vibration isolation system for a centrifugal device such as a domestic clothes washer or the like, the combination of, a movable suspended mass including a rotatable component and means for driving said rotatable component, a fixed platform, a plurality of elongated upstanding rods secured to said suspended mass and supported by said fixed platform and having the weight of the suspended mass directed therethrough to place rods in compression, a spring surrounding the lower portion of each rod for resiliently supporting said suspended mass for relatively flexible movement with respect to said fixed platform, said spring having a cylindrical snubbing element directed therethrough secured to said rod for movement therewith and relative movement with respect to said spring whereby said spring and cylindrical snubbing member frictionally engaging one another and upon relative movement therebetween coacting to produce a predetermined snubbing movement of said suspended mass with respect to said fixed platform.

2. In a vibration isolation system for a centrifugal device such as a domestic clothes washer or the like, the combination of, a movable suspended mass including a rotatable component and means for driving said rotatable component, a fixed platform, a plurality of elongated upstanding rods secured to said suspended mass and supported by said fixed platform and having the weight of the suspended mass directed therethrough to place said rods in compression, a spring for resiliently supporting said suspended mass for relatively flexible movement with respect to said fixed platform, a cylindrical snubbing member directed through said spring and secured to said rod for movement therewith and relative movement with respect to said spring, said spring and cylindrical snubbing member coacting to produce a predetermined snubbing movement of said suspended mass with respect to said fixed platform, each rod having one end thereof fixedly secured to said suspended mass, said snubbing member secured to the opposite end thereof and directed through an opening in said fixed platform for relative movement with respect thereto, said spring having one end thereof in engagement with said fixed platform and the opposite end thereof in engagement with said rod, said snubbing member and spring having an interference fit therebetween to produce said snubbing action.

3. In a vibration isolation system for a centrifugal device such as a domestic clothes washer or the like, the combination of, a movable suspended mass including a rotatable component and means for driving said rotatable component, a fixed platform, a plurality of elongated upstanding rods secured to said suspended mass and supported by said fixed platform and having the weight of the suspended mass directed therethrough to place said rods in compression, a spring for resiliently supporting said suspended mass for relatively flexible movement with respect to said fixed platform, a cylindrical snubbing member directed through said spring and secured to said rod for movement therewith and relative movement with respect to said spring, said spring and cylindrical snubbing member coacting to produce a predetermined snubbing movement of said suspended mass with respect to said fixed platform, a casing surrounding said mass in spaced relationship therewith including spaced reinforced corner portions, a U-shaped spring member secured to each of said reinforced corner portions including a free end thereon spring biased toward said suspended mass, and a snubber pad held between said spring end and said suspended mass for damping lateral movement of said suspended mass with respect to said outer casing.

4. In a vibration isolation system for a centrifugal device such as a domestic clothes washer or the like, the combination of, a movable suspended mass including a rotatable component and means for driving said rotatable component, a fixed platform, a plurality of elongated upstanding rods secured to said suspended mass and supported by said fixed platform and having the weight of the suspended mass directed therethrough to place said rods in compression, a spring for resiliently supporting said suspended mass for relatively flexible movement with respect to said fixed platform, a cylindrical snubbing member directed through said spring and secured to said rod for movement therewith and relative movement with respect to said spring, said spring and cylindrical snubbing member coacting to produce a predetermined snubbing movement of said suspended mass with respect to said fixed platform, said rotatable member being a rotatable spin tub for laundering clothes, said drive means including means for rotating said spin tub at speeds for extracting fluid therefrom during a spin cycle of operation, a water container surrounding said spin tub for receiving fluid extracted therefrom, said rods supporting said water container on said fixed platform, an outer cabinet enclosing said water container, and snubber means secured on said outer cabinet and engageable with the upper portion of said water container to prevent large amplitude lateral movements thereof with respect to said outer casing.

5. In a vibration isolation system for a centrifugal device such as a domestic clothes washer or the like, the combination of, a movable suspended mass including a rotatable component and means for driving said rotatable component, a fixed platform, a plurality of elongated upstanding rods secured to said suspended mass and supported by said fixed platform and having the weight of the suspended mass directed therethrough to place said rods in compression, a spring for resiliently supporting said suspended mass for relatively flexible movement with respect to said fixed platform, a cylindrical snubbing member directed through said spring and secured to said rod for movement therewith and relative movement with respect to said spring, said spring and cylindrical snubbing member coacting to produce a predetermined snubbing movement of said suspended mass with respect to said fixed platform, each rod having one end thereof fixedly secured to said movable suspended mass, said fixed platform having an opening therein, each rod including a plug secured to the opposite end of said rod directed through said fixed support opening, said spring being a coil spring surrounding said plug and having one end thereof in engagement with said plug and the opposite end thereof in engagement with said platform around the opening therein, means for fixedly securing said platform engaging end of said spring to said platform, said cylindrical snubbing member being a cylindrical sleeve of friction material secured to said plug and having the outer surface thereof press fit within said coil spring, said coil spring yielding against a predetermined movement of said suspended mass to cause movement of said plug through said fixed platform opening, said sleeve being carried by said plug during such movement relative to said coil spring whereby said coil spring and sleeve coact to produce a snubbing of such movement.

References Cited
UNITED STATES PATENTS

| | | | |
|---|---|---|---|
| 1,094,589 | 4/1914 | Poland | 248—20 X |
| 3,077,244 | 2/1963 | Eujen | 188—1 |

JOHN PETO, *Primary Examiner.*